United States Patent
Jiang et al.

(10) Patent No.: US 6,922,393 B2
(45) Date of Patent: Jul. 26, 2005

(54) DATA DISCARDING REQUEST ACKNOWLEDGEMENT IN A WIRELESS COMMUNICATIONS PROTOCOL

(75) Inventors: Sam Shiaw-Shiang Jiang, Hsin-Chu (TW); David Jin-Chyang Jiau, Tao-Yuan Hsien (TW)

(73) Assignee: ASUSTek Computer Inc., Taipei (TW)

( * ) Notice: Subject to any disclaimer, the term of this patent is extended or adjusted under 35 U.S.C. 154(b) by 843 days.

(21) Appl. No.: 09/756,738

(22) Filed: Jan. 10, 2001

(65) Prior Publication Data

US 2002/0090005 A1 Jul. 11, 2002

(51) Int. Cl.[7] .............................. H04Q 7/00
(52) U.S. Cl. ............... 370/236; 370/328; 370/410; 370/428
(58) Field of Search ............... 370/310, 328, 370/338, 394, 428, 432, 235, 236, 401, 410, 469

(56) References Cited

U.S. PATENT DOCUMENTS 6,389,016 B1 * 5/2002 Sabaa et al. ............... 370/389
6,493,343 B1 * 12/2002 Garcia et al. ............... 370/394
6,496,481 B1 * 12/2002 Wu et al. ................... 370/242
6,519,223 B1 * 2/2003 Wager et al. ............... 370/216
6,591,101 B1 * 7/2003 Shimbori ................. 455/435.1
6,621,796 B1 * 9/2003 Miklos ....................... 370/236
2002/0072367 A1 * 6/2002 Osafune et al. ............ 455/433

OTHER PUBLICATIONS

3GPP TS 25.322 V3.4.0 (Sep. 2000).

* cited by examiner

Primary Examiner—Ricky Ngo
Assistant Examiner—Richard Chang
(74) Attorney, Agent, or Firm—Winston Hsu

(57) ABSTRACT

A wireless data discarding request is transmitted by a first station to a second station for requesting the second station to discard at least a layer 2 service data unit (SDU). A layer 2 data discard acknowledgment protocol data unit (PDU) is generated by the second station. The layer 2 data discard acknowledgment PDU has a first field that enables the first station to determine the SDUs actually discarded by the second station. The layer 2 data discard acknowledgment PDU is then transmitted to the first station. The first field may contain the discard indication of each requested discarding SDU, the number of SDUs discarded by the second station, the number of SDU-terminating PDUs discarded, or the total number of PDUs discarded.

14 Claims, 19 Drawing Sheets

DATA DISCARDING REQUEST ACKNOWLEDGEMENT IN A WIRELESS COMMUNICATIONS PROTOCOL

BACKGROUND OF THE INVENTION

1. Field of the Invention

The present invention relates to a wireless communications protocol. More specifically, the present invention discloses a data discarding acknowledgment protocol that enables a transmitter to correctly determine the number of layer 2 service data units (SDUs) discarded by a receiver.

2. Description of the Prior Art

The surge in public demand for wireless communication devices has placed pressure upon industry to develop increasingly sophisticated communications standards. The $3^{rd}$ Generation Partnership Project (3GPP™) is an example of such a new communications protocol. Such standards utilize a three-layer approach to communications. Please refer to FIG. 1. FIG. 1 is a block diagram of the three layers in a communications protocol. In a typical wireless environment, a first station 10 is in wireless communications with one or more second stations 20. An application 13 on the first station 10 composes a message 11 and has it delivered to the second station 20 by handing the message 11 to a layer 3 interface 12. The layer 3 interface 12 may generate some layer 3 signaling messages 12a for the purpose of controlling layer 3 operations, such as ciphering key changes used by the layer 3 interfaces 12 and 22 of both the first and the second stations, respectively. The layer 3 interface 12 delivers either the message 11 or the layer 3 signaling message 12a to a layer 2 interface 16 in the form of layer 2 service data units (SDUs) 14. The layer 2 SDUs 14 maybe of any length. The layer 2 interface 16 composes the SDUs 14 into one or more layer 2 protocol data units (PDUs) 18. Each layer 2 PDU 18 is of a fixed length, and is delivered to a layer 1 interface 19. The layer 1 interface 19 is the physical layer, transmitting data to the second station 20. The transmitted data is received by the layer 1 interface 29 of the second station 20 and reconstructed into one or more PDUs 28, which are passed up to the layer 2 interface 26. The layer 2 interface 26 receives the PDUs 28 and builds up one or more layer 2 SDUs 24. The layer 2 SDUs 24 are passed up to the layer 3 interface 22. The layer 3 interface 22 in turn converts the layer 2 SDUs 24 back into either a message 21, which should be identical to the original message 11 that was generated by the application 13 on the first station 10, or a layer 3 signaling message 22a, which should be identical to the original signaling message 12a generated by the layer 3 interface 12 and which is then processed by the layer 3 interface 22. The received message 21 is passed to an application 23 on the second station 20.

Of particular interest is the layer 2 interface, which acts as a buffer between the relatively high-end data transmission and reception requests of the applications and layer 3, and the low-level requirements of the physical transmission and reception process at layer 1. Please refer to FIG. 2. FIG. 2 is a diagram of a transmission/reception process from a layer 2 perspective. The layer 2 interface 32 of a first station 30 receives a string of SDUs 34 from layer 3. The layer 2 SDUs 34 are sequentially ordered from 1 to 5, and are of an unequal length. The layer 2 interface 32 converts the string of SDUs 34 into a string of layer 2 PDUs 36. The layer 2 PDUs 36 are sequentially ordered from 1 to 4, and are all of an equal length. The string of layer 2 PDUs 36 is then sent off to the layer 1 interface for transmission. A reverse process occurs at the second station 40, with the second station 40 layer 2 interface 42 converting a received string of layer 2 PDUs 46 into a received string of layer 2 SDUs 44, which are then passed up to layer 3. There are two delivery modes: in-sequence delivery and out-of-sequence delivery. If the established connection between the first station 30 and the second station 40 is configured to be in the in-sequence delivery mode, the multi-layered protocol insists that the layer 2 interface 42 present the SDUs 44 to layer 3 in order. That is, the layer 2 interface 42 must present the layer 2 SDUs 44 to layer 3 in the sequential order of the SDUs 44, beginning with SDU 1 and ending with SDU 5. The ordering of the SDUs 44 may not be scrambled, nor may a subsequent SDU be delivered to layer 3 until all of the prior SDUs have been delivered. However, if the established connection is configured to be in the out-of-sequence delivery mode, the layer 2 interface 42 can present the layer 2 SDUs 44 to layer 3 out of sequential order.

In line transmissions, such requirements are relatively easy to fulfill. In the noisy environment of wireless transmissions, however, the second station 40 often misses data. Some layer 2 PDUs in the received string of layer 2 PDUs 46 will therefore be missing. Thus, ensuring that the layer 3 SDUs 44 are presented in order, when the system is in the in-sequence delivery mode, can pose a significant challenge. Even in the out-of sequence delivery mode, a layer 2 SDU can not be presented until all of its composing layer 2 PDUs have been correctly received. Please refer to FIG. 3. FIG. 3 is a block diagram of a data PDU 50, as defined in the 3GPPT™ TS 25.322 specification. In general, there are two types of PDUs: a control PDU or a data PDU. Control PDUs are used by layer 2 to control data transmission and reception protocols. Data PDUs are used to transmit acknowledged mode data, which is then reassembled and presented to layer 3 as layer 2 SDUs. The example PDU 50 is a data PDU, and is divided into several fields, as defined by the layer 2 protocol. The first field 51 is a single bit indicating that the PDU 50 is either a data or a control PDU. As the data/control bit 51 is set (i.e., equal to 1), the PDU 50 is marked as an acknowledged mode data PDU. The second field 52 is a sequence number (SN) field, and is twelve bits long. Successive PDUs have successively higher sequence numbers, and in this way a receiver can properly reassembled PDUs to form SDUs. That is, if a PDU is transmitted with an SN equal to 536, the next PDU would be transmitted with an SN equal to 537, and so forth. A single polling bit 53 follows the SN field 52, and when set indicates that a receiver of the PDU 50 should respond with an acknowledgment status PDU, which is one kind of control PDU, and which will be introduced later. Bit 54 is reserved and is set to zero. The next bit 55a is an extension bit, and when set indicates the presence of a following length indicator (LI). An LI may be either 7 bits long or 15 bits long, and is used to indicate the ending position of an SDU within the PDU. If a single SDU completely fills the data region 58 of the PDU 50, then the bit 55a would be zero, thereby indicating that no LI is present. In the example PDU 50, however, there are two SDUs ending in the PDU 50: SDU1 57a and SDU2 57b. There must, therefore, be two LIs to indicate the respective ends of the SDU1 57a and the SDU2 57b. A PDU following the PDU 50 would hold the LI for SDU3 57c. The first LI, LI1, is in field 56a following the extension bit field 55a, and marks the end of the SDU1 57a. LI1 56a has an extension bit 55b that is set, indicating the presence of another LI, LI2 in field 56b. LI2 56b indicates the ending position of the SDU2 57b, and has an extension bit 55c that is cleared, signifying that there are no more LIs, and that the data region 58 is thus beginning.

In the following discussion, stations may be base stations, mobile units, personal data assistants, or other devices that use a three-layered wireless communications protocol. Each station has a receiving window that is delimited by two state variables: VR(R) and VR(MR). VR(R) marks the beginning of the receiving window of the station, and VR(MR) marks the end of the receiving window, exclusively. That is, the SN value held by VR(MR) is not included in the receiving window, whereas the SN values sequentially before VR(MR), and on or after VR(R), are within the receiving window. Each station expects to receive only PDUs that have SN values that land within the receiving window. Other PDUs are discarded. To better understand this, please refer to FIG. 4. FIG. 4 is a phase diagram 70 for a receiving window 73. In FIG. 4, the receiving window 73 has a VR(R)=3852 at position 71, and a VR(MR)=206 at position 72. At position 74, the SN values roll over to zero due to the finite bit-length of the SN field in PDUs. The maximum possible SN value is 4095 (i.e., $2^{12}-1$). The receiving window 73 thus has a width of 450 PDUs. VR(MR) is always kept a fixed PDU SN value distance away from VR(R). That is, VR(MR)=VR(R)+the receiving window width (i.e., 450). As PDUs are received, the station advances VR(R), and thus advances the receiving window 73. VR(R) may not advance past any PDU that has not yet been properly received.

Please refer to FIG. 5. FIG. 5 is a phase diagram 80 for a transmitting window 83. In a manner analogous to the receiving window 73, each station also has a transmitting window 83 that is delimited by two state variables: VT(A) and VT(MS). VT(A) marks the beginning of the transmitting window 83, and VT(MS) marks the end of the transmitting window 83, exclusively. That is, the SN value held by VT(MS) is not included in the transmitting window 83, whereas the SN values sequentially before VT(MS), and on or after VT(A), are within the receiving window 83. VT(MS) is kept a fixed PDU SN value distance away from VT(A), i.e., VT(MS)=VT(A)+transmitting window width. For FIG. 5, VT(A)=3752 at position 81, and VT(MS)=106 at position 82. Again, roll over to zero occurs at position 84. The transmitting window 83 is thus also 450 PDUs wide. A station may only transmit PDUs that have SN values falling within the range of the transmitting window 83. Each transmitting station advances VT(A), and thus advances the transmitting window 83, upon reception of an acknowledgment status PDU from a receiving station. The acknowledgment status PDU contains the most recent value of VR(R) from the receiving station, and is sent periodically or upon receipt of a PDU with the polling bit 53 set. When an acknowledgment status PDU is received, the transmitting station sets its state variable VT(A) equal to the VR(R) value contained in the acknowledgment status PDU. In this manner, the transmitting window 83 of a transmitting station should ideally move forward in lock step with the receiving window 73 of a receiving station.

As the receiving window 73 and the transmitting window 83 advance with each other, PDUs stream from the first station are assembled into corresponding SDUs by the second station. These SDUs are then passed in order to layer 3. As noted previously, the communications protocol requires that SDUs be delivered to layer 3 fully whether the connection is in the in-sequence delivery mode or in the of out-of-sequence mode. However, the protocol does allow SDUs to be discarded. This may occur, for example, due to a timeout, in which the data in the SDU is no longer relevant. When a layer 2 SDU is discarded at the layer 2 level, i.e., by discarding the layer 2 PDUs that carry the layer 2 SDU, layer 2 must inform layer 3 of the SDUs that were discarded. To discard layer 2 SDUs, the first station sends layer 2 control PDUs to the second station indicating which SDUs are to be discarded. Upon reception of this control PDU, the second station adjusts its receiving window 73 accordingly, and informs its layer 3 of the SDUs that have been discarded. The second station then informs the first station that the discarding procedure has been performed by sending a layer 2 discarding control acknowledgment PDU. Upon receipt of the acknowledgment PDU from the second station, the first station layer 2 interface informs its layer 3 interface of the discarded SDUs. In this manner, the layer 3 interfaces of the first and second stations are both properly informed of discarded SDUs, and the discarded SDUs should be the same for both stations. That is, both the first station layer 3 and the second station layer 3 should agree upon the SDUs that were discarded, thus ensuring that applications and the layer 3 signaling messages in the two stations have proper data-synchronization with each other.

The control PDU sent by the first station to the second station for discarding SDUs is termed a Move Receiving Window (MRW) request PDU. Please refer to FIG. 6. FIG. 6 shows an MRW super-field 90 in an MRW request PDU 91. The MRW super-field 90 comprises a type field 92 of four bits that identifies the PDU 91 as an MRW request PDU, a length field 93 of four bits for indicating the number of subsequent SN_MRW entries 96, and an $N_{Length}$ field 95 of four bits. If the length field 93 holds a value of zero, then the MRW request PDU 91 will have only one subsequent SN_MRW entry 94, which contains an SN value that extends beyond the transmitting window of the first station. Each SN_MRW entry 94, is 12 bits wide and is used to indicate the end of a discarded SDU, containing the SN value for the PDU that holds the end of the discarded SDU. The last entry SN_MRW$_{Length}$ 94a, together with the $N_{Length}$ entry 95, informs the second station how the state variable VR(R) for its receiving window should be set. The $N_{Length}$ entry 95 indicates how many LIs and corresponding data in the SN_MRW$_{Length}$ PDU should be discarded. The second station updates the state variable VR(R), which marks the beginning of the receiving window, to the value in the SN_MRW$_{Length}$ field 94a if the original VR(R) has a value sequentially before the value in the SN_MRW$_{Length}$ field 94a.

After processing the MRW request PDU 91, the second station sends back to the first station an acknowledgement PDU, which is called an MRW acknowledgment PDU. Please refer to FIG. 7, with reference to FIG. 6. FIG. 7 shows an MRW acknowledgment PDU 60. The MRW acknowledgment PDU 60 comprises three fields: a type field 62, an N field 65 and an SN_ACK field 64. The type field 62 is four bits wide and is set to a value that identifies the control PDU 60 as an MRW acknowledgment PDU 60. The N field 65 is also 4 bits wide and is set equal to the $N_{Length}$ field 95 of the original MRW request PDU 91 that is being acknowledged if the SN_ACK field 64 is equal to the SN_MRW$_{Length}$ field 94a of the original MRW request PDU 91 that is being acknowledged. Otherwise, the N field 65 is set equal to zero. The SN_ACK field 64 is 12 bits wide, and is set equal to the updated VR(R) value after the reception and execution of the MRW request PDU 91. Upon receipt of the MRW acknowledgment PDU 60, the first station can determine that the second station has processed the original MRW request PDU 91 and the original SDU discarding procedure is terminated. A new SDU discarding procedure can be started only after the previous SDU discarding procedure has been terminated.

To better understand the above, please refer to FIG. 8 and FIG. 9, with reference to FIG. 1. FIG. 8 is a diagram of a string of SDUs 100. FIG. 9 illustrates a sample MRW super-field 110 for discarding a portion of the SDUs 100 shown in FIG. 8. In FIG. 8, individual layer 2 PDUs that carry the layer 2 SDUs 100 are marked with dotted lines. SDU_11 ends in a PDU 101 having an SN value of 90. SDU_12 ends in a PDU 102 having an SN value of 95. SDU_13 and SDU_14 both end in a PDU 103 having an SN value of 96. Finally, SDU_15 begins in a PDU 104 with an SN value of 97. To discard SDU_11, SDU_12 and SDU_13, the first station 10 builds the MRW super-field 110 and sends the MRW super-field 110 to the second station 20 as an MRW request PDU 111. The type field 112 is set to an MRW type indicator. The length field 113 holds a value of three, indicating that three SN_MRW entries follow. SN_MRW$_1$ entry 114 is set to 90, indicating the end position of SDU_11 that is to be discarded, corresponding to PDU 101. The second entry SN_MRW$_2$ 115 is set to 95, indicating that SDU_12, which is to be discarded, ends in PDU 102. Finally, the last entry SN_MRW$_3$ 116, together with N$_3$ 117 equal to 1, indicates that the first LI in PDU 103, and the data the LI references, are to be discarded. This corresponds, then, to throwing out SDU_13. SDU_14, on the other hand, is kept.

Please refer to FIG. 10 with reference to FIGS. 8, 9 and 1. FIG. 10 illustrates an MRW acknowledgment PDU 120 sent by the second station 20 to the first station 10 after processing the MRW request PDU 111. The MRW acknowledgment PDU 120 comprises a type field 121 that identifies the PDU 120 as an MRW acknowledgment PDU, an N field 127 that is set equal to the N$_3$ field 117 in the original MRW request PDU 111, and an SN_ACK field 126 that is equal to the SN_MRW$_3$ field 116 in the MRW request PDU 111. Upon receipt of the MRW acknowledgment PDU 120, by parsing the N field 127 and the SN_ACK field 126, the first station 10 can know that the second station 20 responded to the original MRW request PDU 111, and that the second station 20 has advanced its receiving window starting point VR(R) to 96, i.e., to the value indicated in the SN_ACK field 126. The first station 10 thus assumes that the second station 20 has discarded SDU_11, SDU_12 and SDU_13, and is waiting for layer 2 PDU 103 to begin processing of SDU_14 and the following layer 2 SDUs. The layer 2 interface 16 of the first station 10 thus informs the layer 3 interface 12 that SDU_11, SDU_12 and SDU_13 have been discarded. In FIG. 8, arrow 105 marks a hypothetical position of the receiving window state variable VR(R) for the second station 20. That is, prior to processing the MRW request PDU 111, the second station 20 was waiting for a layer 2 PDU 106 and the subsequent layer 2 PDU 101 from the first station 10 to complete layer 2 SDU_11. However, after processing the MRW request PDU 111, the second station 20 throws away all data that had been collected for SDU_11, and advances VR(R) forward (thus advancing the receiving window) to a position indicated by arrow 107, which corresponds to an SN value of 96. The second station 20 thus awaits reception of the PDU 103 and subsequent PDUs from the first station 10 to process SDU_14, SDU_15 and so on. As with the first station 10, the second station 20 layer 2 interface 26 informs the layer 3 interface 22 of the discarded SDU_11, SDU_12 and SDU_13. The first and second stations 10 and 20 thus both agree upon the SDUs discarded by the MRW request PDU 111 and subsequent MRW acknowledgment PDU 120.

In general, the receiving window of the second station 20 will advance beyond the transmitting window of the first station 10 since the second station 20 reports with an acknowledgement status PDU on a periodic base or after it receives a poll from the first station 10, which does not trigger a poll with every layer 2 PDU sent. Additionally, the first station 10 may occasionally fail to receive an acknowledgment status PDU from the second station 20 (due to interference, etc.), and thus will fail to update its transmitting window to reflect the new state of the second station 20 receiving window. The first station 10 may thus not be aware of how far advanced is the receiving window of the second station 20, and consequently request that the second station 20 discard a complete layer 2 SDU. For example, consider FIG. 11, with reference to FIGS. 1, 9 and 10. FIG. 11 is a diagram of the string of layer 2 SDUs 100 depicted in FIG. 8 with an advanced receiving window for the second station 20. The start of the receiving window, VR(R), is advanced slightly to the layer 2 PDU 102, as indicated by arrow 105a. That is, VR(R)=95 for the second station 20, and the second station 20 is waiting on the PDU 102 to complete layer 2 SDU_12. SDU_11, on the other hand, has already been completely received and passed up to the layer 3 interface 22 of the second station 20 as a layer 2 SDU. The first station 10, having failed to receive an acknowledgment status PDU from the second station 20, sends the MRW request PDU 111, perhaps due to an acknowledgment time-out. As before, the second station 20 will respond to the MRW request PDU 111 with the MRW acknowledgment PDU 120, and advance VR(R) to the position indicated by the arrow 107. As the second station 20 has already received SDU_11 and passed it up to the layer 3 interface 22, the layer 2 interface 26 will simply inform the layer 3 interface 22 that SDU_12 and SDU_13 have been discarded. The first station 10, however, upon receipt of the MRW acknowledgment PDU 120 from the second station 20, will still inform its layer 3 interface 12 that SDU_11, SDU_12 and SDU_13 have been discarded. Application 13 on the first station 10 thus mistakenly believes that application 23 on the second station 20 has not received the layer 2 SDU SDU_11.

SUMMARY OF THE INVENTION

It is therefore a primary objective of this invention to provide a method for acknowledging a data discarding request that enables a transmitter of the data discarding request to know how much data has been discarded by a receiver of the request.

Briefly summarized, the preferred embodiment of the present invention discloses acknowledging a wireless data discarding request transmitted by a first station to a second station for requesting the second station to discard at least a layer 2 service data unit (SDU). A layer 2 data discard acknowledgment protocol data unit (PDU) is generated. The layer 2 data discard acknowledgment PDU has a first field that enables the first station to determine the total number of layer 2 SDUs discarded by the second station. The layer 2 data discard acknowledgment PDU is then transmitted to the first station. The first field may contain the discard indication of each requested discarding of the layer 2 SDUs, the number of SDUs discarded by the second station, the number of SDU-terminating PDUs discarded, or the total number of PDUs discarded.

It is an advantage of the present invention that by providing the first field in the layer 2 data discard acknowledgment PDU, the first station can know which layer 2 SDUs were discarded by the second station. Applications on the first and second stations are thus correctly informed of the data that has been transmitted and received.

These and other objectives of the present invention will no doubt become obvious to those of ordinary skill in the art after reading the following detailed description of the preferred embodiment, which is illustrated in the various figures and drawings.

DETAILED DESCRIPTION OF THE PREFERRED EMBODIMENT

In the following description, a communications protocol as disclosed in the 3GPPT™ specification TS 25.322, V3.5.0, is used by way of example. However, it should be clear to one in the art that any wireless communications protocol that suffers from ambiguity when acknowledging discarding of layer 3 data can benefit from the method and system of the present invention.

It is the method of the present invention to build a layer 2 data discard acknowledgment protocol data unit (PDU) having a unique field that unambiguously indicates the layer 2 service data units (SDUs) discarded. The layer 2 data discard acknowledgment PDU is transmitted by a second station to a first station after processing a Move Receiving Window (MRW) request PDU from the first station. The MRW request PDU requests discarding of the layer 2 SDUs. The layer 2 data discard acknowledgment PDU is thus termed an MRW acknowledgment PDU in the following discussion.

Figure 1:
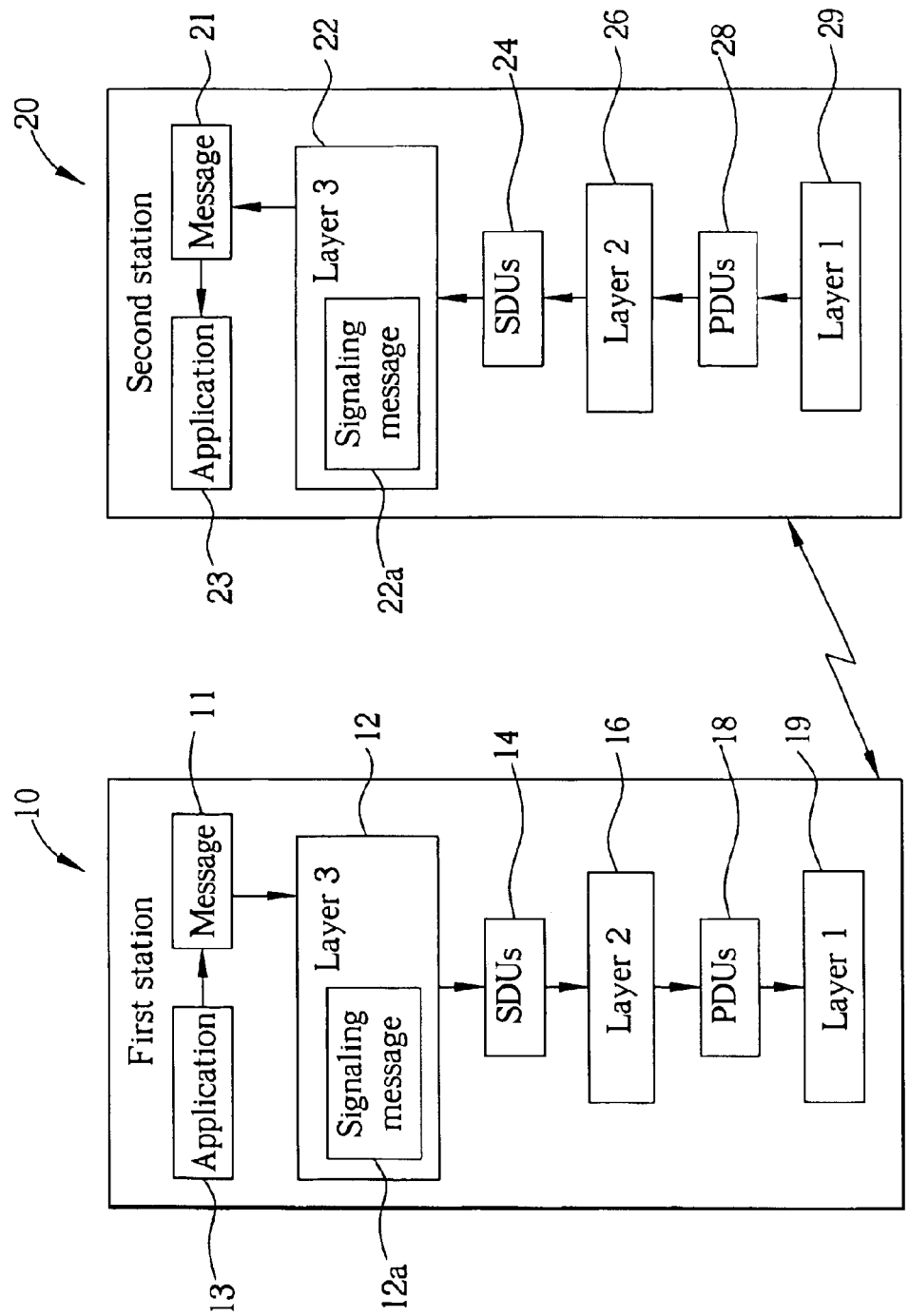
FIG. 1 is a block diagram of a three-layer communications protocol.
Figure 2:
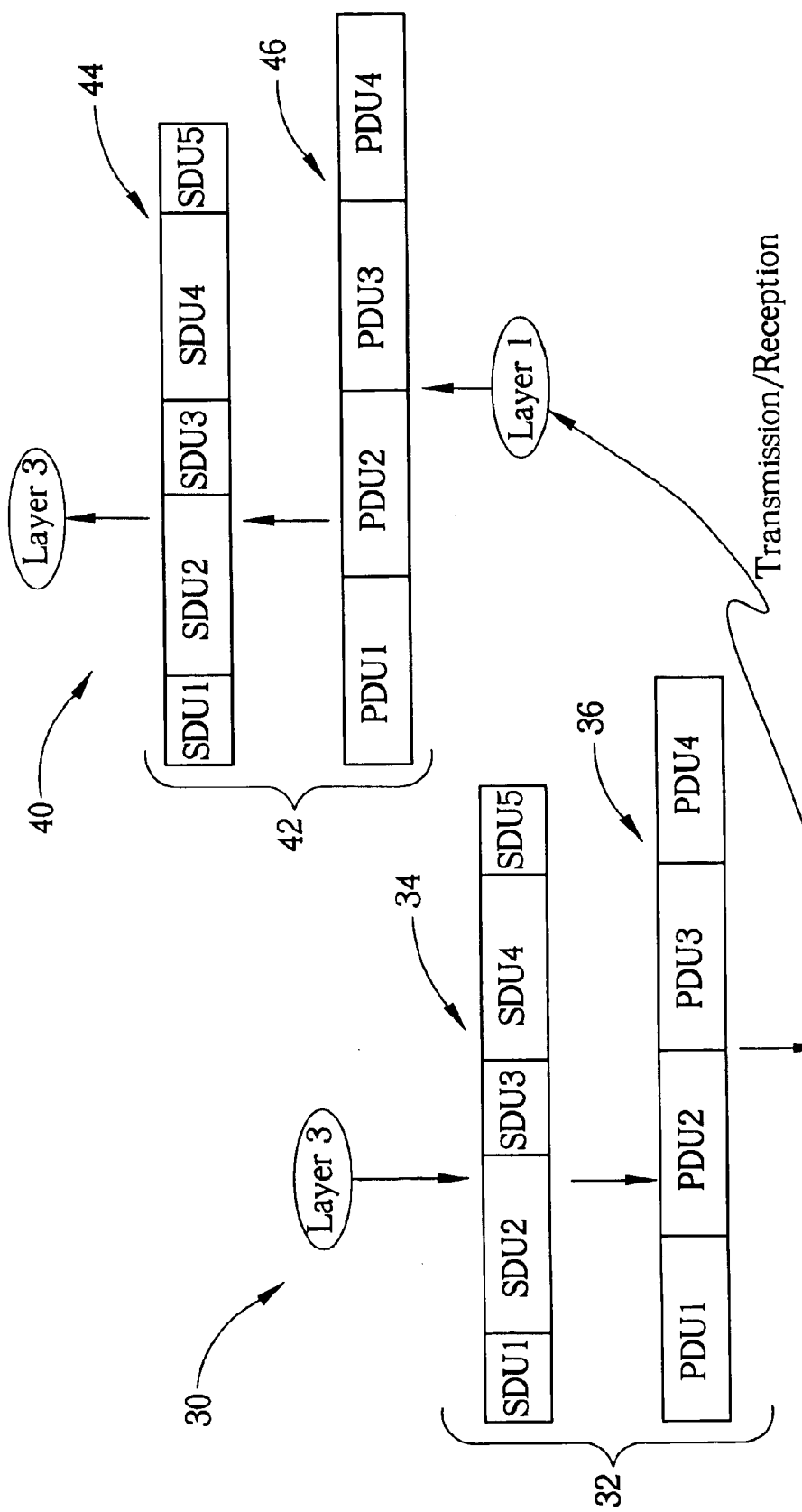
FIG. 2 is a diagram of a transmission/reception process from a layer 2 perspective.
Figure 3:
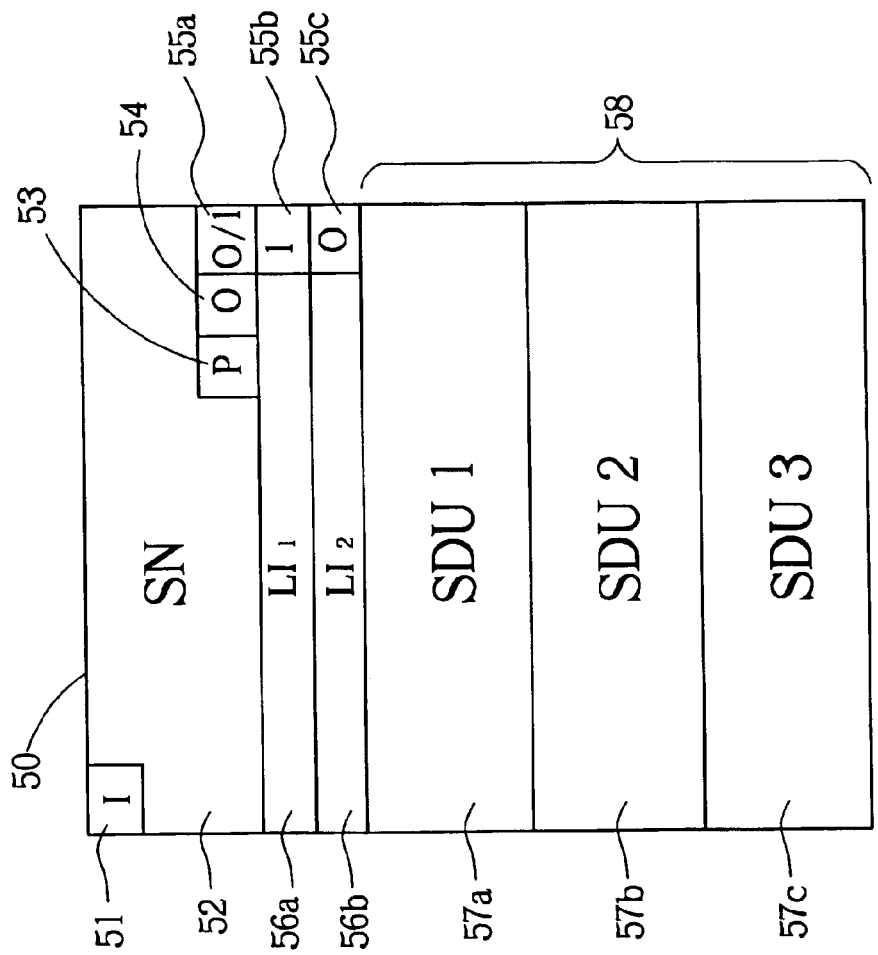
FIG. 3 is a block diagram of a layer 2 protocol data unit (PDU).
Figure 4:
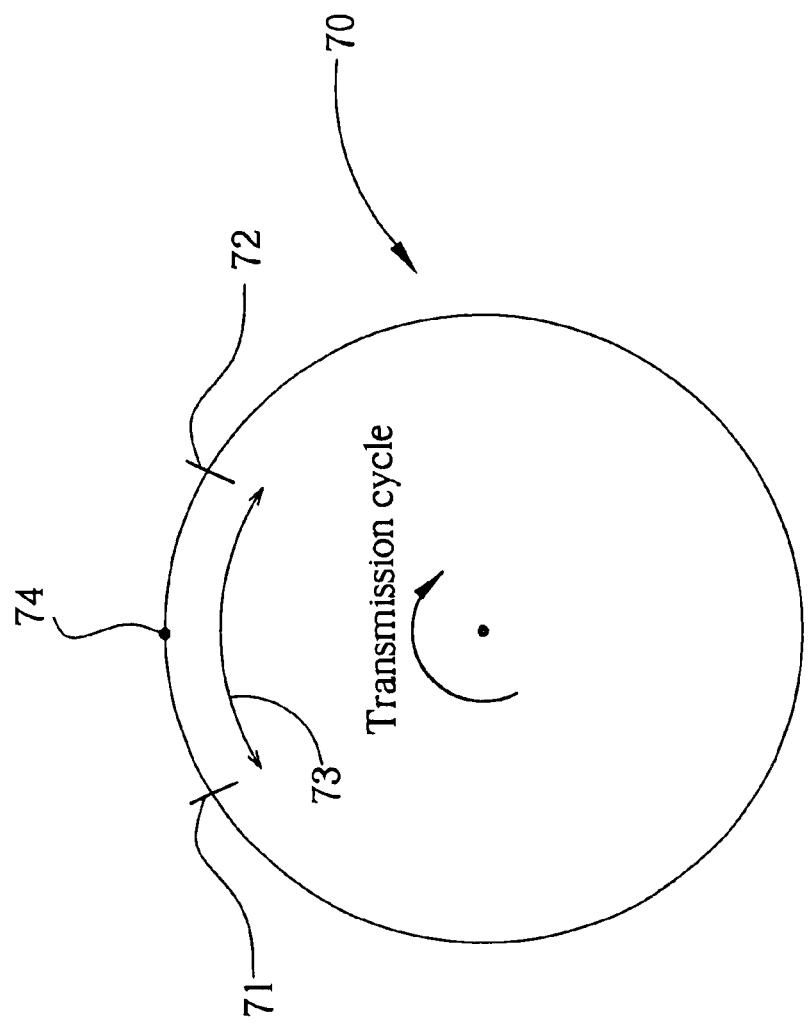
FIG. 4 is a phase diagram for a receiving window.
Figure 5:
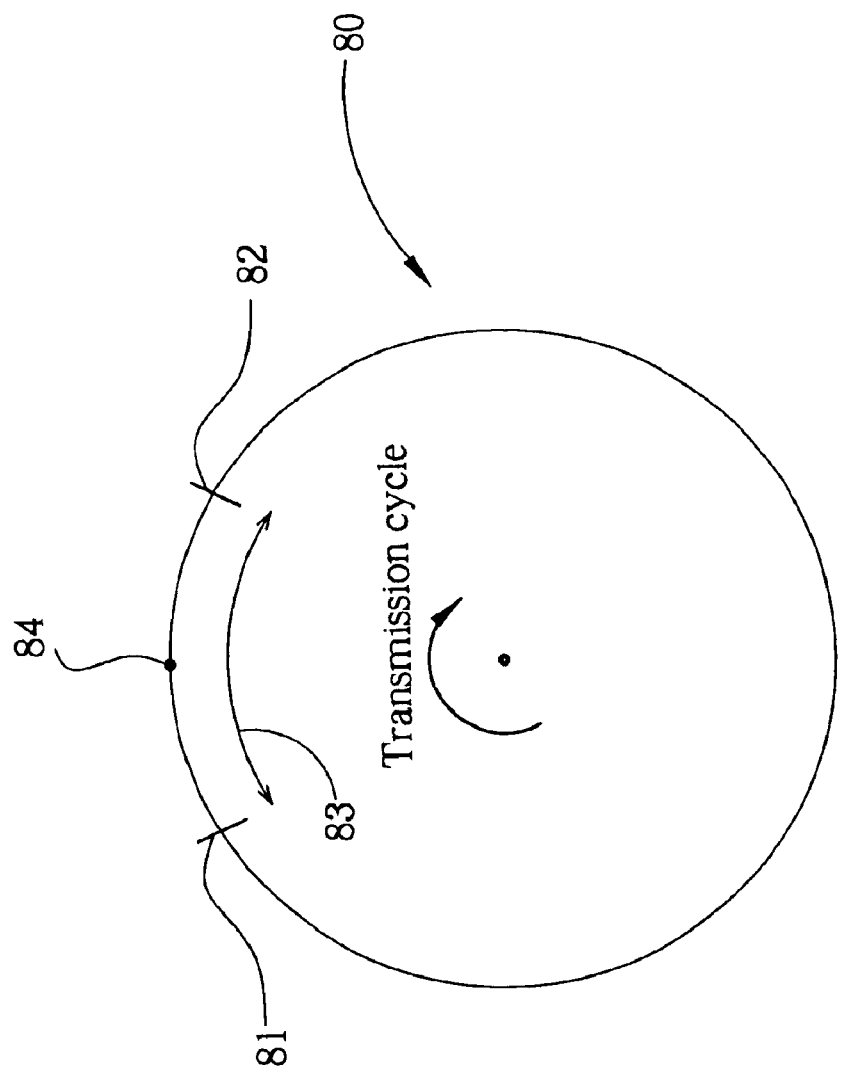
FIG. 5 is a phase diagram for a transmitting window.
Figure 6:
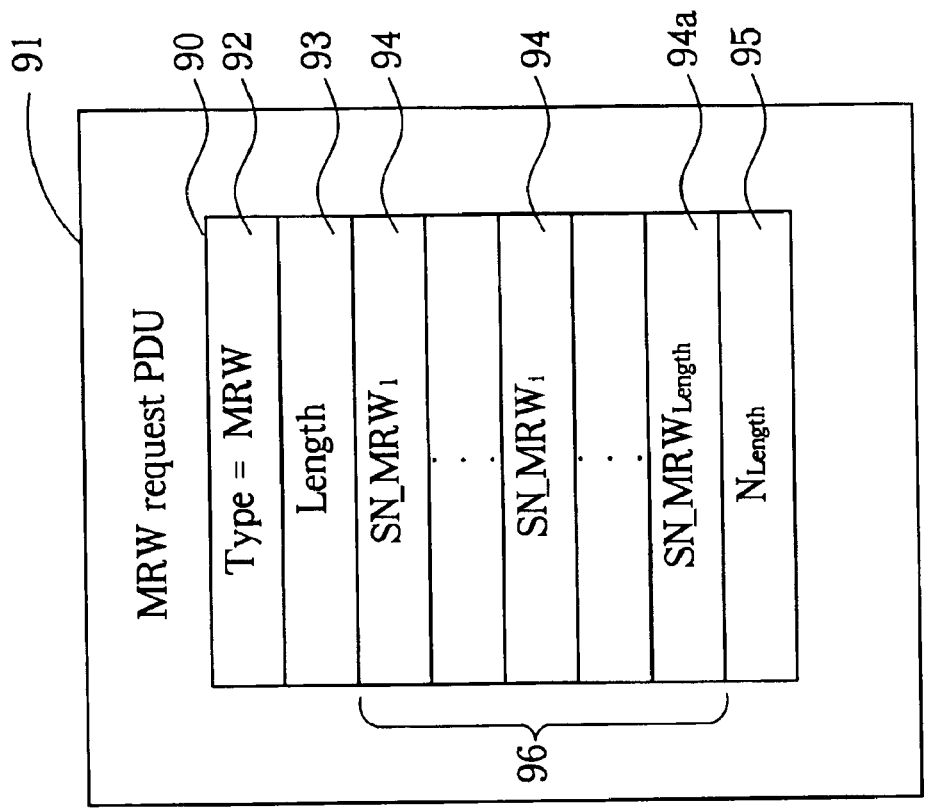
FIG. 6 shows a move receiving window (MRW) super-field in an MRW request PDU.
Figure 7:
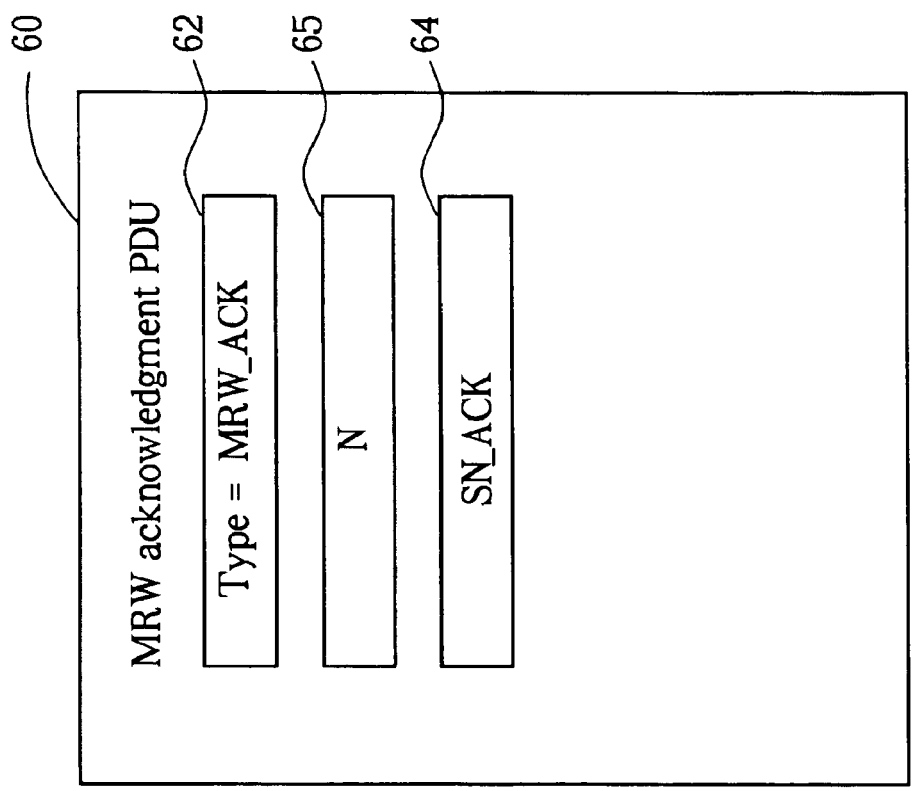
FIG. 7 shows a prior art MRW acknowledgment PDU.
Figure 8:
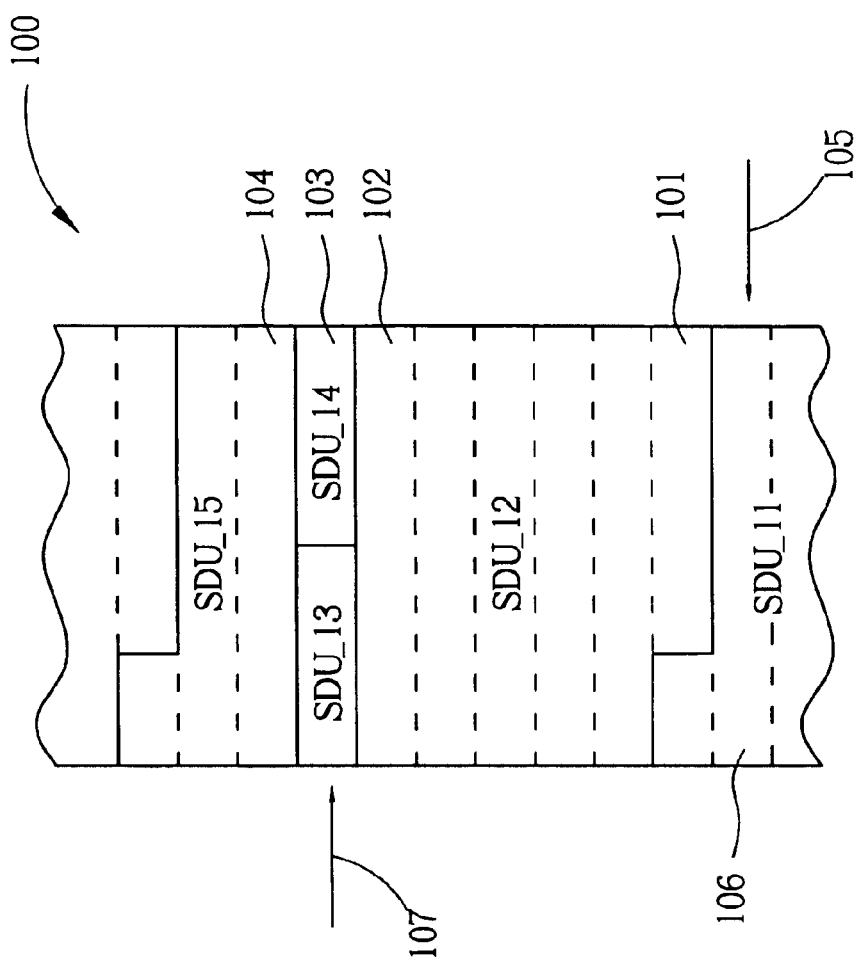
FIG. 8 is a block diagram of SDUs within a string of PDUs.
Figure 9:
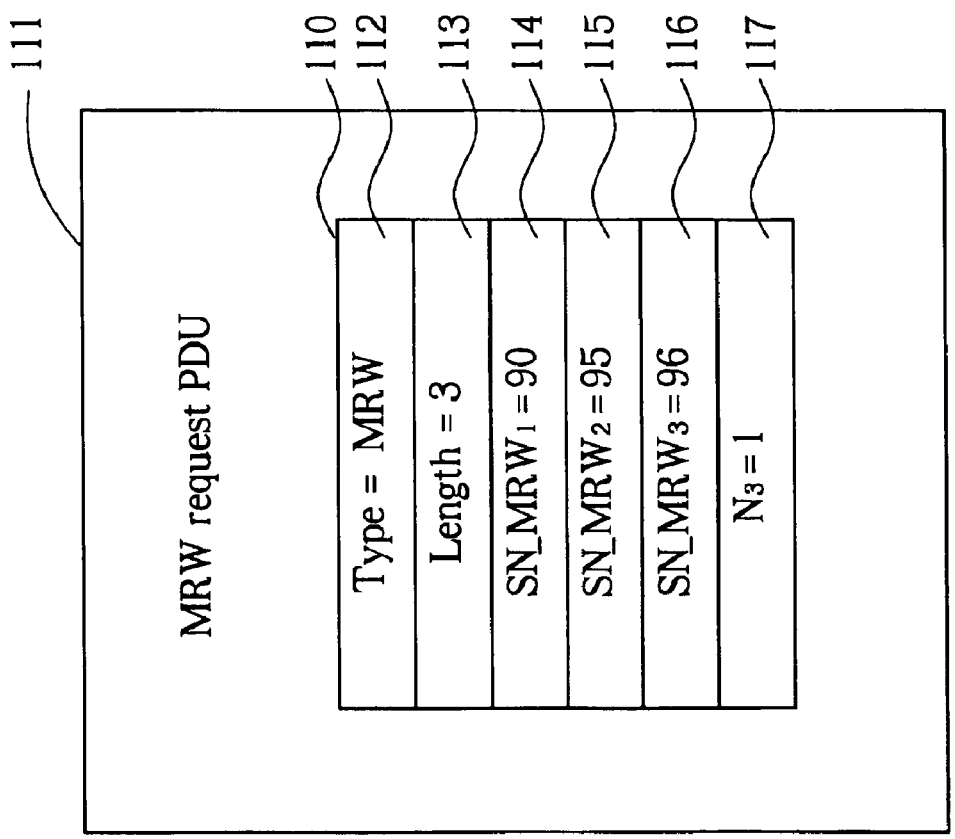
FIG. 9 illustrates a sample MRW super-field for discarding a portion of the SDUs shown in FIG. 8.
Figure 10:
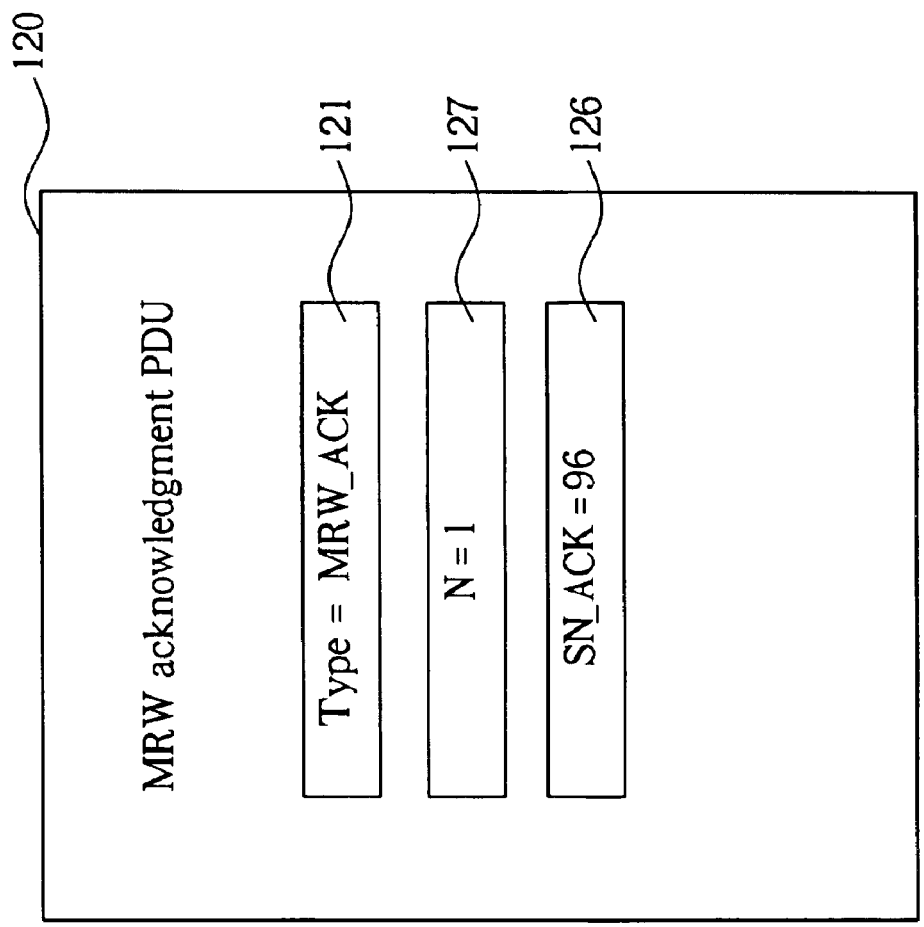
FIG. 10 illustrates a sample MRW acknowledgment PDU for the MRW super-field shown in FIG. 9.
Figure 11:
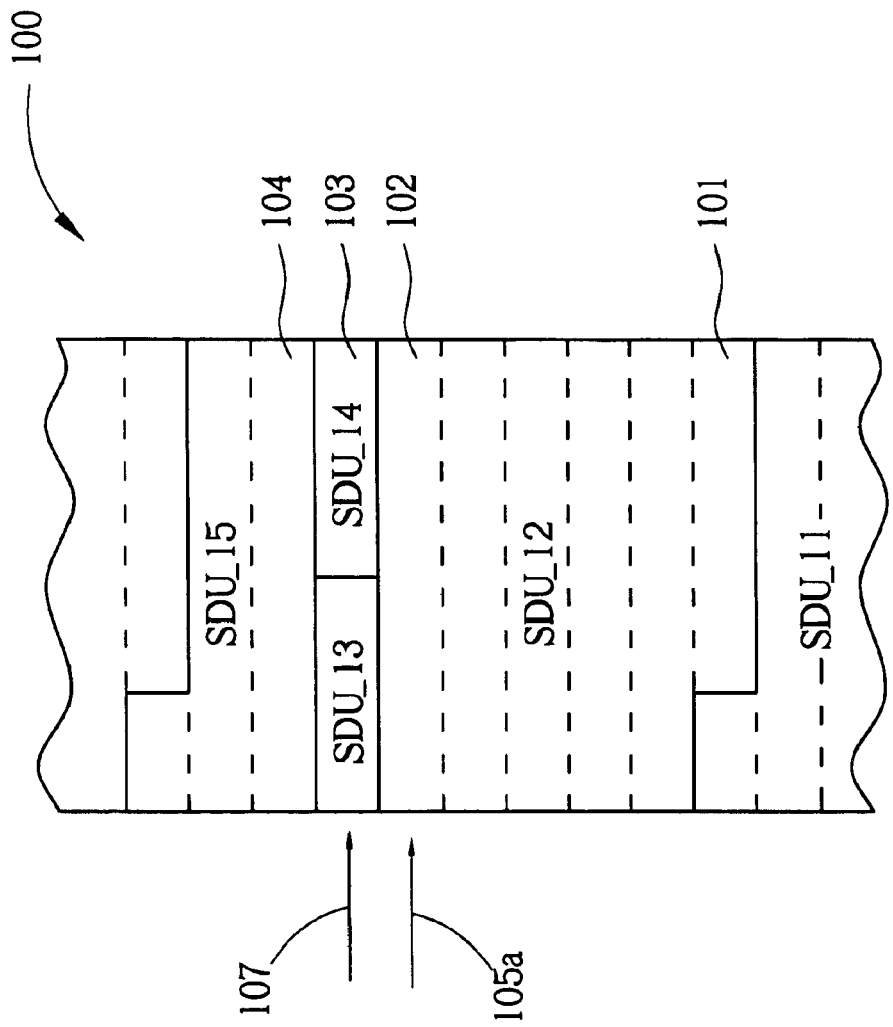
FIG. 11 is another block diagram of SDUs within a string of PDUs.
Figure 12:
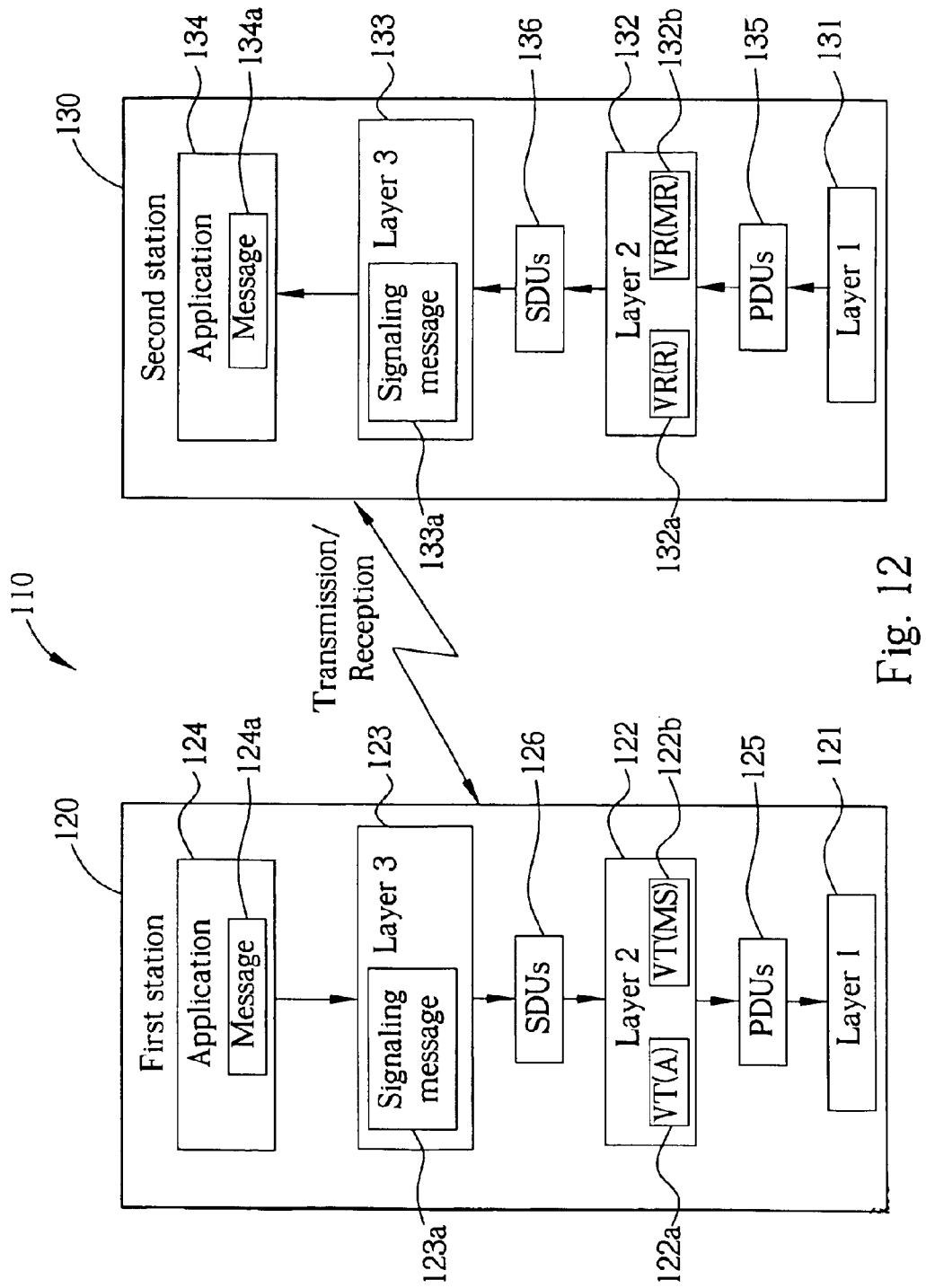
FIG. 12 is a block diagram of a communications system that utilizes the method of the present invention.

To better understand the above, please refer to FIG. 12. FIG. 12 is a block diagram of a communications system 110 that utilizes the method of the present invention. The communications system 110 comprises a first station 120 and a second station 130. The first and second stations 120, 130 may be base stations, mobile stations, handheld transceivers, personal data assistants (PDAs), computing devices, etc. In particular, the first station 120 has an application 124 that wishes to send a message 124a to an application 134 on the second station 130. To send the message 124a, the application 124 negotiates with a layer 3 interface 123. Sometimes, the layer 3 interface 123 may itself generate layer 3 signaling messages 123a. The layer 3 interface 123 submits the message 124a, or the layer 3 signaling message 123a, to the layer 2 interface 122 in the form of a layer 2 service data unit (SDU) 126. Each SDU 126 can have a variable length. The layer 2 interface 122 composes the SDUs 126 into one or more protocol data units (PDUs) 125, each of which has a fixed length. The PDUs 125 are then delivered to the layer 1 interface 121 which performs the physical transmission of data. It should be clear to one skilled in the art that the actual physical layer used for the layer 1 interface 121 may be of any wireless type for the purposes of the present invention. Upon reception of the transmitted data, a layer 1 interface 131 on the second station 130 composes the data into one or more PDUs 135, which are passed to a layer 2 interface 132. The layer 2 interface 132 reassembles the PDUs 135 in layer 2 SDUs 136, which are passed up to a layer 3 interface 133. The layer 3 interface 133 uses the layer 2 SDUs 136 to deliver a message 134a to the application 134, or to process the layer 3 signaling message 133a. The application message 134a, or the layer 3 signaling message 133a, that is received should be identical to the application message 124a or the layer 3 signaling message 123a that was transmitted.

The form and function of the SDUs 126, 136, and PDUs 125, 135 in the present invention are essentially identical to that discussed above in the Description of the Prior Art. The layer 2 interface 122 on the first station 120 has, in particular, two state variables: VT(A) 122a and VT(MS) 122b. As previously explained, VT(A) 122a marks a starting sequence number (SN) value for a transmitting window of the first station 120. VT(MS) 122b marks an ending SN value for the transmitting window, exclusive of VT(MS) 122b. The first station 120 should only transmit PDUs 125 having sequence numbers that fall within the transmitting window, as defined by VT(A) 122a (inclusively) and VT(MS) 122b (exclusively). Similarly, the layer 2 interface 132 of the second station 130 has, in particular, two receiving window state variables: VR(R) 132a and VR(MR) 132b. VR(R) 132a inclusively marks the beginning SN value for the receiving window of the second station 130, and VR(MR) 132b exclusively marks the ending SN value for the receiving window. The second station 130 expects to receive only PDUs 135 that have SN values that land within the receiving window, as defined by VR(R) 132a (inclusively) and VR(MR) 132b (exclusively).

Figure 13:
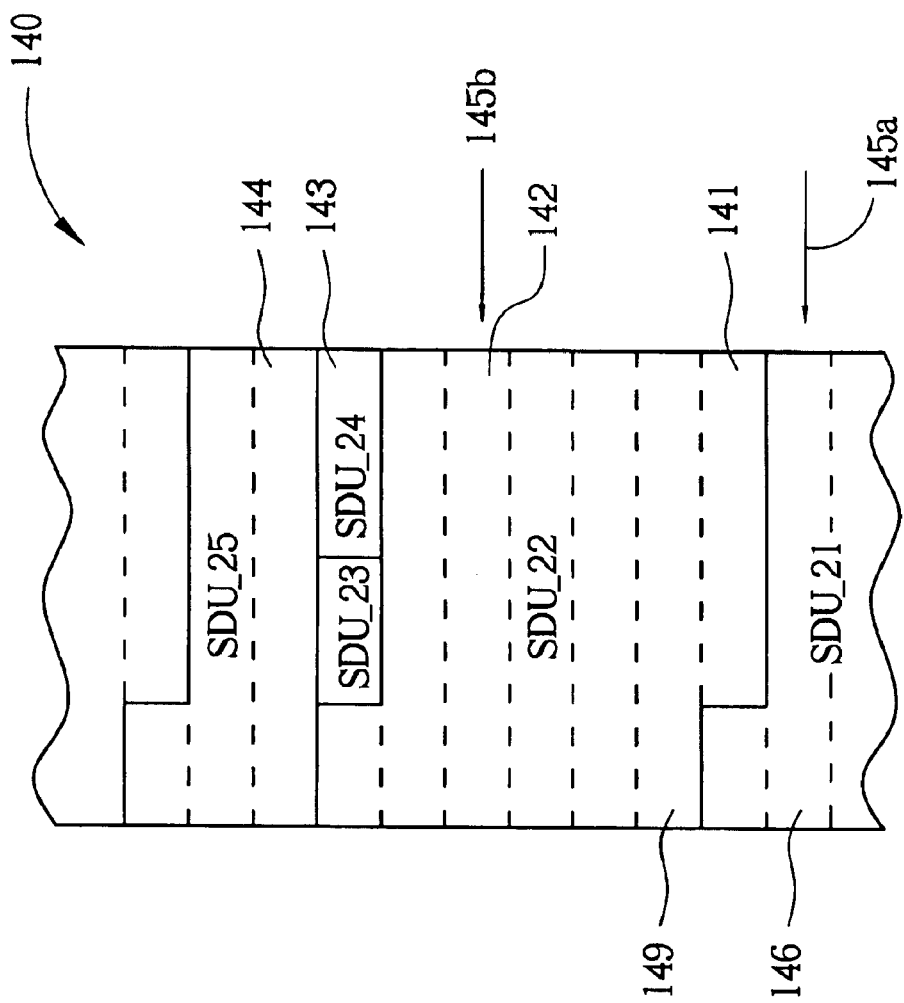
FIG. 13 is a block diagram of a string of SDUs.
Figure 14:
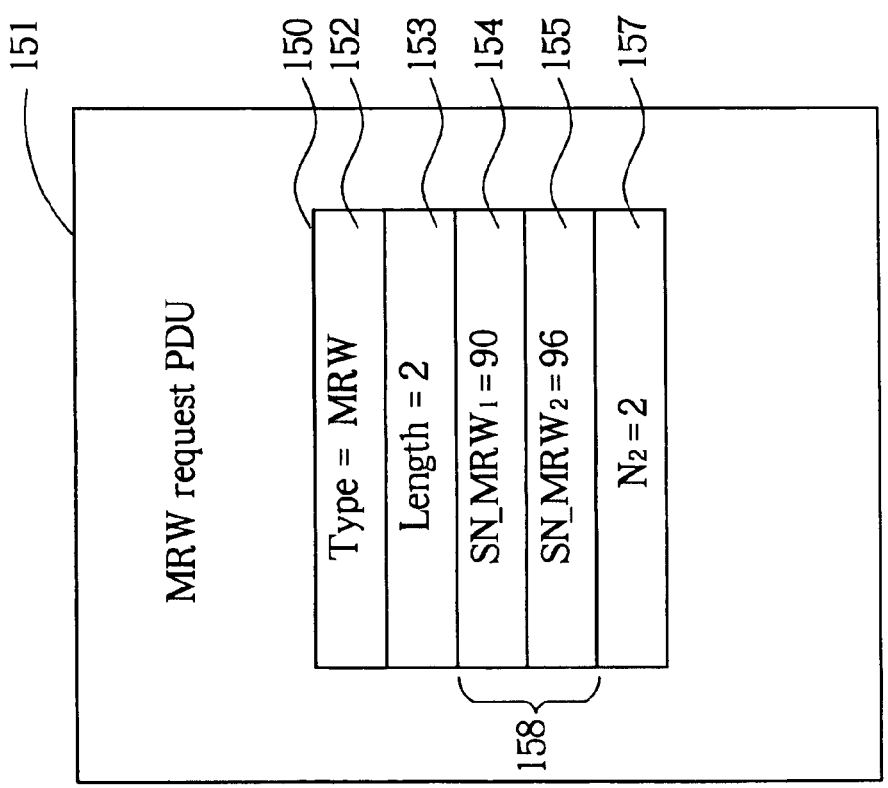
FIG. 14 illustrates an MRW request PDU for discarding a portion of the SDUs depicted in FIG. 13.

Please refer to FIGS. 13 and 14, with reference to FIG. 12. FIG. 13 is a block diagram of a string of layer 2 SDUs 140. FIG. 14 illustrates an MRW request PDU 151 for discarding a portion of the layer 2 SDUs 140. The layer 2 SDUs 140 are carried by layer 2 PDUs 149, which are marked by dotted lines. In particular, SDU_21 has a terminating PDU 141. That is, the terminating end of SDU_21 is carried by the PDU 141. Similarly, SDU_22 has a terminating PDU 143. SDU_23 and SDU_24 are both carried within the same PDU 143, and thus their terminating PDU is also the PDU 143. SDU_25 subsequently begins in PDU 144. Due to a timeout, the first station 120 wishes that SDU_21, SDU_22 and SDU_23 be discarded. We may imagine that VT(A) 122a holds an SN value that points to PDU 146, as indicated by arrow 145a. The first station 120 thus composes the MRW request PDU 151 and sends the MRW request PDU 151 to the second station 130. The PDU 141 has an SN value of 90. The PDU 143 thus has an SN value of 96. The MRW request PDU 151 has an MRW super-field 150 with a type field 152, a length field 153, SN_MRW entries 158, and an $N_2$ entry 157. The type field 152 is set to indicate that the PDU 151 is an MRW request PDU 151. The length field 153 indicates that two SN_MRW entries follow, the entries 158. SN_MRW$_1$ 154 marks the terminating layer 2 PDU 141 for SDU_21. SN_MRW$_2$ 155 marks the terminating PDU 143 for SDU_22. SN_MRW$_2$ 155, in conjunction with the $N_2$ entry 157, marks the terminating PDU 143 for SDU_23. The $N_2$ entry 157 tells the layer 2 interface 133 in the second station 130 that the first and second length indicators (LIs) in the PDU 143, and the data these LIs reference, are to be discarded. The first two LIs in the PDU 143 mark the ends of SDU_22 and SDU_23, respectively. Consequently, the layer 2 SDUs SDU_21, SDU_22 and SDU_23 are discarded, whereas SDU_24 is not.

Figure 15:
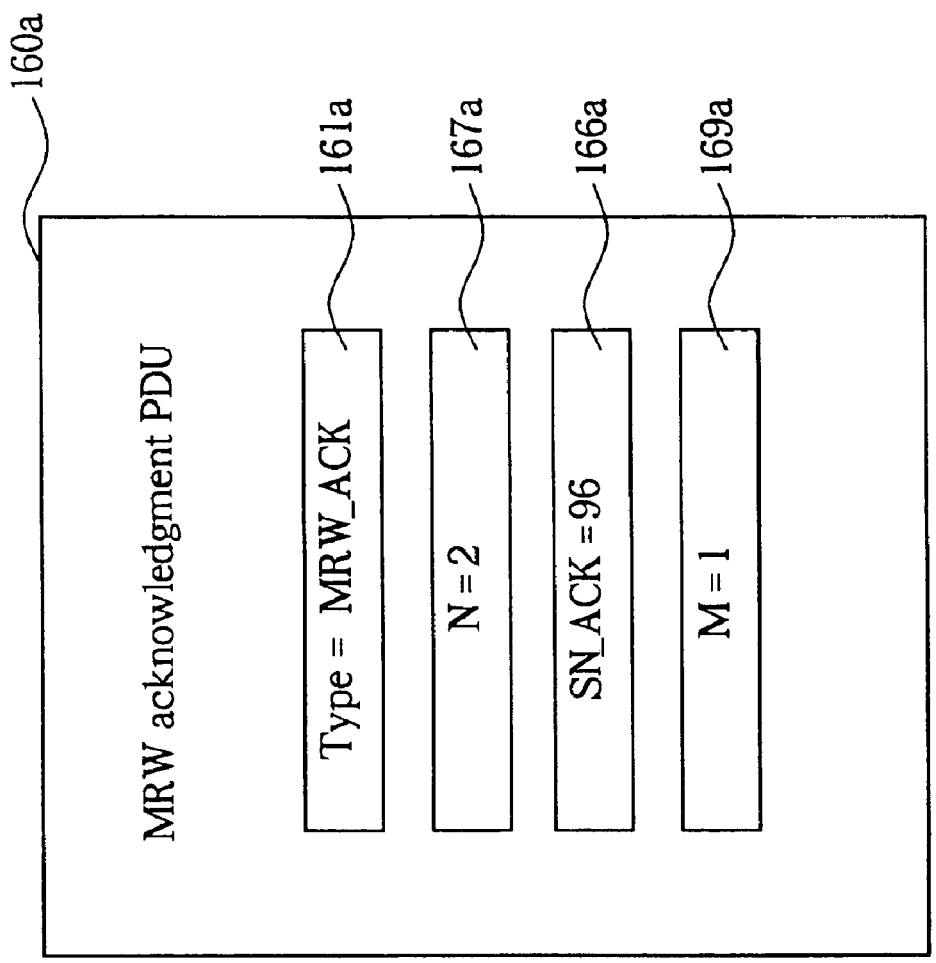
FIG. 15 is a block diagram of an MRW acknowledgment PDU according to the present invention.

Please refer to FIG. 15, with reference to FIGS. 12–14. For purposes of the following discussion, we assume that VR(R) 132a of the second station 130 is equal to 89, i.e., that VR(R) 132a points to PDU 146, as indicated by arrow 145a. After processing the MRW request PDU 151, the second station 130 composes an MRW acknowledgment PDU 160a of the present invention, and sends the MRW acknowledgment PDU 160a to the first station 120. The second station 130 also updates the state variable VR(R) 132a to SN_MRW$_2$ 155, and informs the layer 3 interface 133 that SDU_21, SDU_22 and SDU_23 have been discarded. The MRW acknowledgment PDU 160a of the present invention comprises a type field 161a, an N field 167a, an SN_ACK field 166a and an M field 169a. The type field 161a indicates that the PDU 160a is an MRW acknowledgment PDU 160a. The N field 167a is set equal to the $N_2$ field 157 of the original MRW request PDU 151. The SN_ACK field 166a is set equal to the last SN_MRW entry 158, i.e., is equal to SN_MRW$_2$ 155. Finally, of key importance to the present invention, the M field 169a is set to a value that unambiguously enables the first station 120 to determine the layer 2 SDUs 140 actually discarded by the second station 130 after processing the MRW request PDU 151.

As introduced in the Description of the Prior Art, the first station 120 and second station 130 have two possible modes of operation when exchanging data: in-sequence mode and out-of-sequence mode. The following embodiments are valid for the in-sequence data transfer mode only. In a first embodiment of the present invention, the M field 169a is set equal to the number of SDU-terminating PDUs discarded. SDU-terminating PDUs are those PDUs that contain the terminal end of an SDU. For FIG. 13, this would include the PDU 141 and the PDU 143. The PDU 143, however, is not actually discarded, as it contains SDU_24, which is kept. Thus, the number of discarded SDU-terminating PDUs is one, and so the M field 169a is set equal to one. The first station 120 knows that SDU_24 is to be kept, and thus that the PDU 143 cannot be discarded by the second station 130. Furthermore, in the in-sequence mode, the three-layer protocol insists that layer 3 SDUs be delivered complete and in sequence. Consequently, by analyzing the M field 169a, the first station 120 can determine that PDU 141 was discarded, and thus know that SDU_21, SDU_22 and SDU_23 were all discarded. The layer 2 interface 122 of the first station 120 thus informs the layer 3 interface 123 that SDU_21, SDU 22 and SDU 23 have been discarded, which agrees with what was told to the layer 3 interface 133 of the second station 130.

Although the M field 169a of FIG. 15 shows the number of SDU-terminating PDUs discarded (M=1), it is also possible to use other defining values for the M field 169a. For example, in a second embodiment, the M field 169a could instead hold the actual number of SDUs discarded by the second station 130, in which case the M field 169a would hold a value of three (M=3). Alternatively, in a third embodiment, the M field 169a could hold the total number of layer 2 PDUs discarded, in which case the M field 169a would hold the value of 7 (M=7). In this case, by counting backwards from the layer 2 PDU 143, the first station 120 could learn that, at the time of receiving the MRW request PDU 151, VR(R) 132a for the second station 130 was at PDU 146, and thus know the total number of layer 2 SDUs discarded by the second station 130. The layer 2 interface 122 can thus inform the layer 3 interface 123 accordingly.

Figure 16:
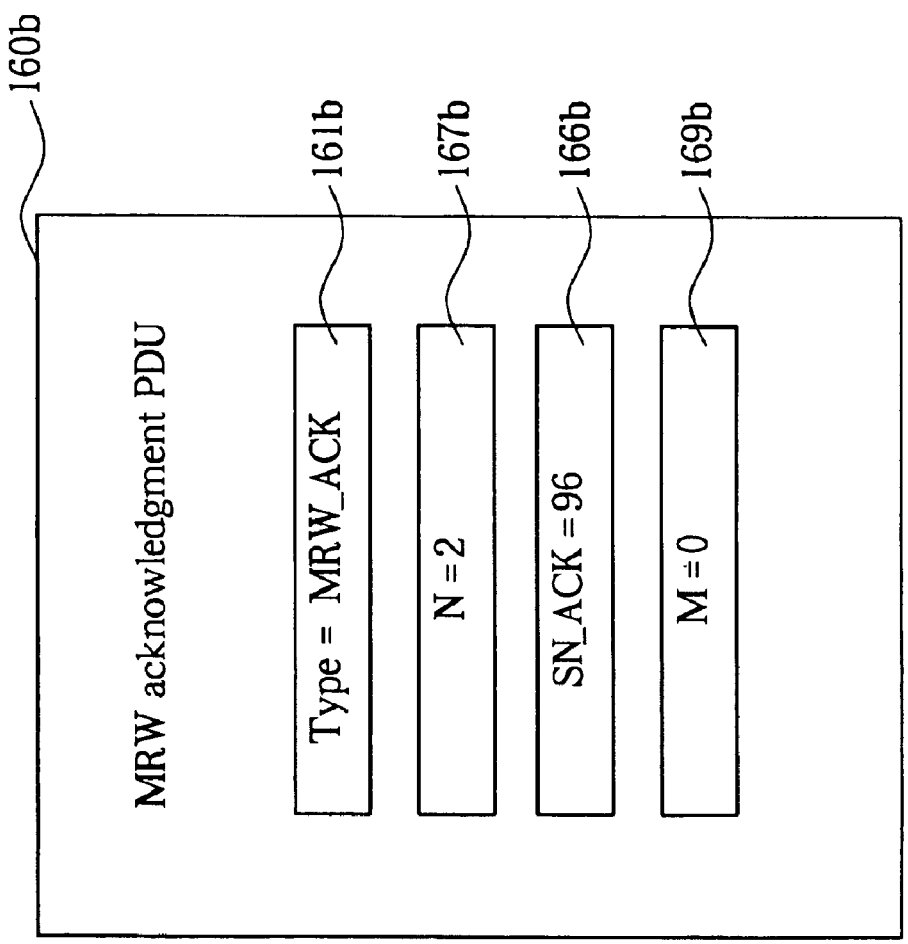
FIG. 16 is another MRW acknowledgment PDU according to the present invention.

Please refer to FIG. 16 with reference to FIGS. 12–15. FIG. 16 is another MRW acknowledgment PDU 160b that comprises a type field 161b, an N field 167b, an SN_ACK field 166b and an M field 169b according to the present invention. However, the MRW acknowledgment PDU 160b shows an MRW acknowledgment when, on receiving the MRW request PDU 151, VR(R) 132a for the second station 130 points to a PDU position as indicated by arrow 145b. In this case, SDU_21 has already been passed up to the layer 3 interface 133, and thus cannot be discarded by the second station 130. Instead, in the first embodiment, the second station 130 sends the MRW acknowledgment PDU 160b with an M field 169b set equal to zero (M=0), indicating that no SDU-terminating PDUs were discarded, and transmits the MRW acknowledgment PDU 160b to the first station 120. Since SDU_22 ends in the PDU 143, and as the PDU 143 cannot be discarded because of SDU_24 the first station 120 learns that only the layer 2 SDUs SDU_22 and SDU_23 were discarded, and informs the layer 3 interface 123 accordingly. For this example, if the second embodiment is used, the M field 169b would instead indicate the actual number of layer 2 SDUs discarded, and would hold a value of 2 (M=2). Alternatively, for the third embodiment, the M field 169b holds the number of layer 2 PDUs discarded, and would thus hold a value of two (M=2). As a final note for these in-sequence communication mode values for the M field 169a and 169b, it should be understood that the SN_ACK field 166a and 166b is also used by the first station 120 to determine which layer 2 SDUs were discarded by the second station 130. For example, if VR(R) 132a had pointed to the PDU 144 upon reception of the MRW request PDU 151, then the SN_ACK field 166b would hold a value of 97, rather than the value of 96 shown in FIG. 16. The M field 169b would still be zero. The first station 120 would thus know that SDU_21 SDU_22 and SDU_23 had already been received by the second station 130 and thus could not be discarded.

Figure 17:
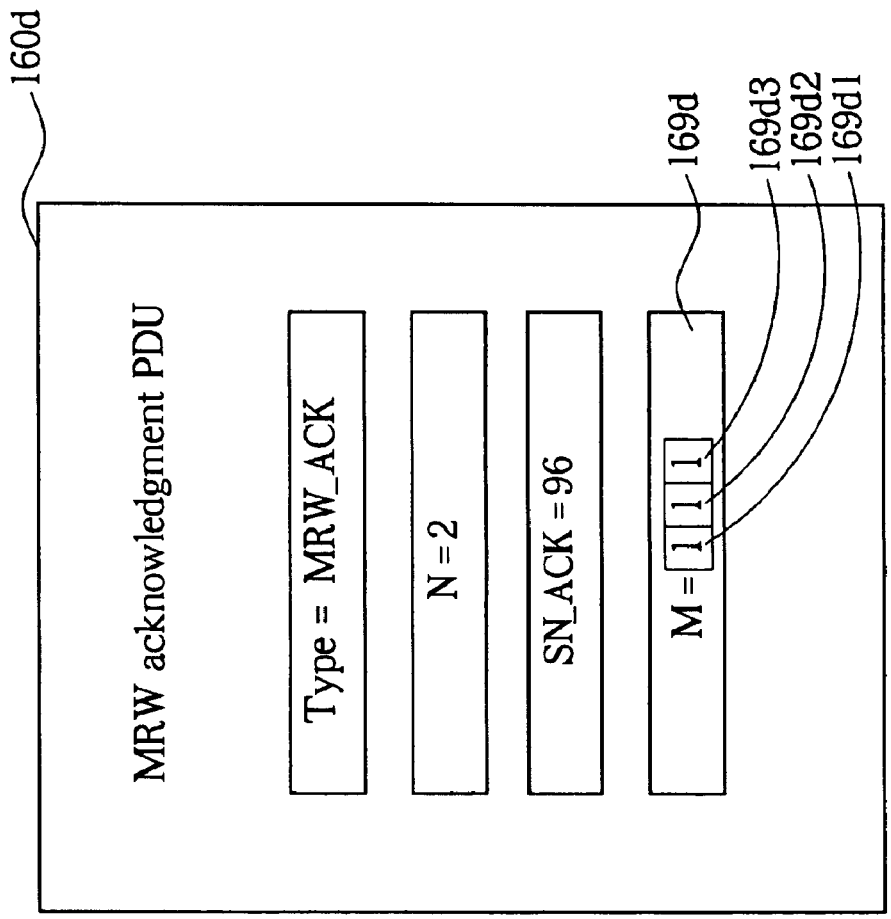
FIGS. 17 to 19 are block diagrams of MRW acknowledgment PDUs according to the preferred embodiment of the present invention.
Figure 18:
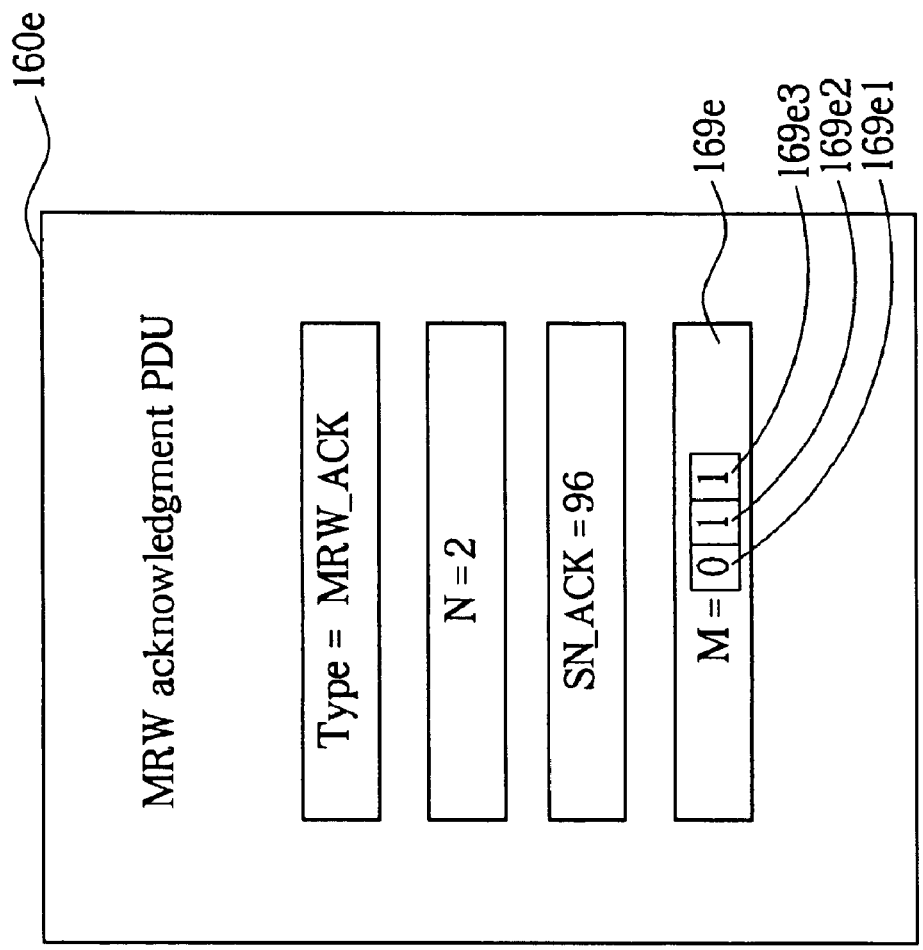
Figure 19:
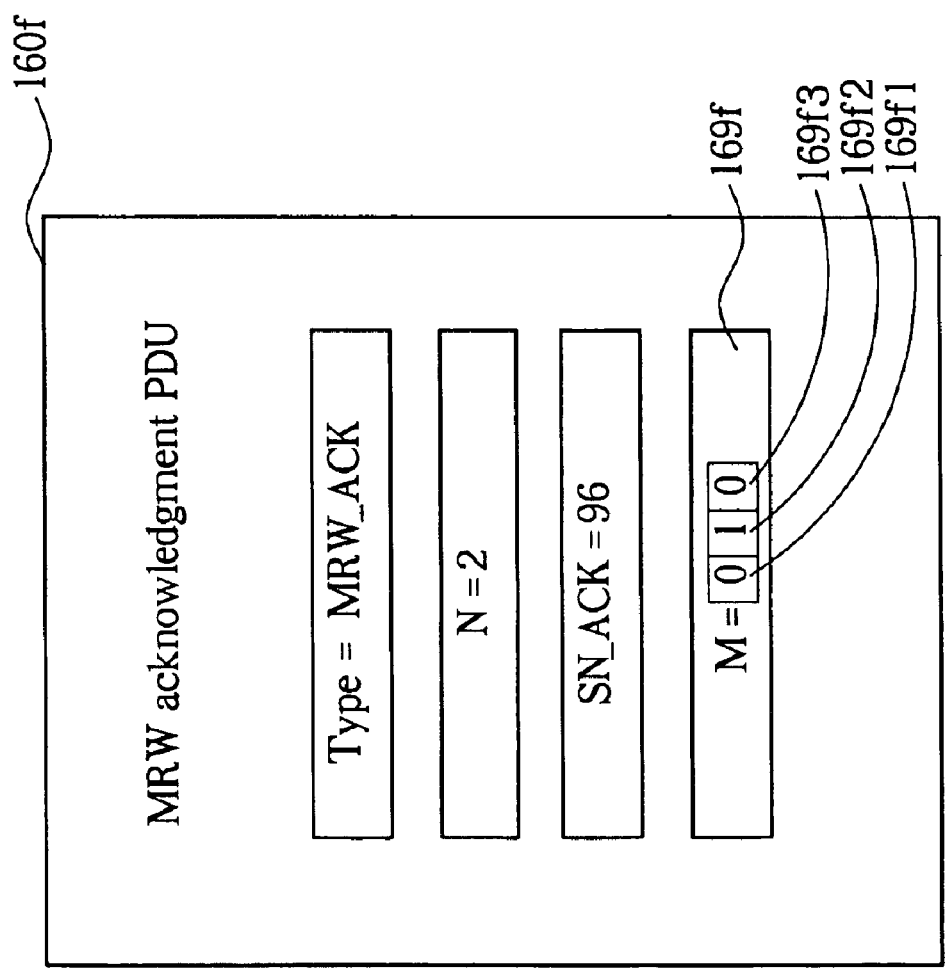

Please refer to FIG. 17 to 19 with reference to FIGS. 12 to 14. FIGS. 17 to 19 are block diagrams of MRW acknowledgment PDUs 160d, 160e and 160f according to the preferred embodiment of the present invention. The following discusses the preferred embodiment of the present invention, which is applicable to both the in-sequence and the out-of-sequence data transfer modes. In the preferred embodiment, M fields 169d, 169e, 169f hold a bitmap of discarded layer 2 SDUs that corresponds to the SN_MRW entries 158 of the MRW request PDU 151. The M field 169d, 169e, 169f must have a bit length that is at least as long as one plus the number of entries in the SN_MRW field 158. As a bitmap is used to indicate exactly which layer 2 SDUs are discarded, and which are not, the M field 169d, 169e, 169f can work for both in-sequence and out-of-sequence data transfer modes. Each bit in the bitmap indicates a discard state for the SDUs indicated by the SN_MRW entries 158. The additional bit (i.e., the "one plus" bit) is used to indicate the discarding state of additional SDUs in the final PDU indicated by the last of the SN_MRW entries 158. It should be born in mind that the N entry 157 may hold a value that is greater than or equal to zero. If zero, the N entry 157 indicates that no data is to be discarded in the final PDU indicated by the last of the SN_MRW entries 158. If greater than one, the N entry 157 indicates the number of additional SDUs to be discarded in this final PDU. The "one plus" bit is used to indicate the discard state of these additional SDUs in the final PDU.

For example, consider the MRW acknowledgment PDU 160d of FIG. 17 sent by the second station 130 after processing the MRW request PDU 151. Upon receiving the MRW request PDU 151, the state variable VR(R) 132a of the second station 130 is pointing at the layer 2 PDU 146, as indicated by arrow 145a. The second station 130 composes the M field 169 as a bitmap with three bits: 169d1, 169d2 and 169d3. The first bit 169d1 corresponds to the SN_MRW$_1$ entry 154 in the MRW request PDU 151. The second bit 169d2 corresponds to the first SDU that ends in the PDU indicated by the SN_MRW$_2$ entry 155 in the MRW request PDU 151, i.e., SDU_22. The third bit 169d3 corresponds to the N$_2$ entry 157 in the MRW request PDU 151, and indicates the discard state for the second SDU that ends in the PDU indicated by the SN_MRW$_2$, i.e., SDU_23. Note that as the N$_2$ entry 157 holds a value of two, the third bit 169d3 stands for the discard state of only one SDU, SDU_23. However, in the general case, it should be clear that this bit could stand for zero or a plurality of SDUs, depending on the value held in the N$_2$ entry 157. When any of the bits in the M field 169d are set to a first state (i.e., set equal to one), they indicate that the correlating layer 2 SDU(s) from the MRW request PDU 151 has/have been discarded. Most bits in the M field 169d have a one-to-one correlation with a layer 2 SDU to be discarded. It is only the last bit 169d3 that, due to the N$_2$ field 157, could indicate discarding of zero, one or more layer 2 SDUs. If the last bit 169d3 is set to one, then the requested discarding operation has been performed, be it zero, one or more layer 2 SDUs. In the M field 169d, all of the bits are set to one, indicating that all of the layer 2 SDUs in the original MRW request PDU 151 have been discarded.

For FIG. 18, VR(R) 132a is indicated by the arrow 145b upon reception of the MRW request PDU 151. The MRW acknowledgment PDU 160e of FIG. 18 is sent by the second station 130 after processing the MRW request PDU 151. The first bit 169e1 is set to a second state (i.e., zero), indicating that the layer 2 SDU SDU_21, as requested from SN_MRW$_1$ 154, has not been discarded. The bits 169e2 and 169e3 are set to one, indicating that the layer 2 SDUs SDU_22 and SDU_23 have been discarded as requested.

For FIG. 19, VR(R) 132a is also indicated by the arrow 145b upon reception of the MRW request PDU 151. However, in this case, we further imagine that, excepting a PDU 142, the second station has received all PDUs up to and including the PDU 144. If an out-of-sequence mode is used, SDU_21, SDU_23 and SDU_24 can be passed up to the layer 3 interface 133 of the second station 130, though SDU_22 cannot, as SDU 22 is missing the PDU 142. The MRW acknowledgment PDU 160f of FIG. 19 is thus sent by the second station 130. The first bit 169f1 is set to zero, indicating that the layer 2 SDUs SDU 21 has not been discarded, as the SDU_21 was passed up to the layer 3 interface 133. Similarly, bit 169f3 is set to zero, indicating that the layer 2 SDU SDU_23 has already been passed up to the layer 3 interface 133, and thus has not been discarded as requested. The second bit 169f2 is set to one, indicating that SDU_22 has been discarded.

In contrast to the prior art, the present invention provides a method and corresponding system that enables a first station to unambiguously determine the number of layer 2 SDUs discarded by a second station. To do this, a unique field is provided in the data discard acknowledgment PDU that identifies either the number of SDU-terminating PDUs discarded, the number of SDUs discarded, the total number of PDUs discarded, or provides a bitmap of the discard state of the SDUs. The layer 2 interface on the first station can thus correctly inform the layer 3 interface of the actual number of layer 2 SDUs discarded, and which layer 2 SDUs were discarded.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for acknowledging a wireless data discarding request transmitted by a first station to a second station for requesting the second station to discard at least a layer 2 service data unit (SDU), the method comprising:

generating a layer 2 data discard acknowledgment protocol data unit (PDU), the layer 2 data discard acknowledgment PDU comprising a first field that ensures the first station to determine the number of layer 2 SDUs discarded by the second station; and transmitting the layer 2 data discard acknowledgment PDU to the first station;

wherein the first field indicates the number of layer 2 PDUs discarded by the second station when discarding the layer 2 SDUs.

2. A method according to claim 1 wherein each layer 2 SDU to be discarded has a terminating layer 2 PDU that holds a terminating end of the layer 2 SDU, and the first field indicates the number of terminating layer 2 PDUs discarded by the second station.

3. A method according to claim 1 wherein the first field comprises a bitmap that indicates a discard state for each layer 2 SDU to be discarded.

4. A method according to claim 1 wherein the layer 2 data discard acknowledgement PDU farther comprises a second field for indicating a starting sequence number for an updated receiving window of the second station, and a third field for indicating discarding of layer 2 SDU data within a PDU having the starting sequence number.

5. A method according to claim 1 wherein the first station comprises a layer 2 interface and a layer 3 interface, and the first field in the layer 2 acknowledgment PDU enables the layer 2 interface to inform the layer 3 interface of the number of layer 2 SDUs discarded by the second station.

6. A wireless communications system comprising:

a first station capable of transmitting a data discarding request, the data discarding request being used to request discarding of at least a layer 2 service data unit (SDU); and a second station capable of receiving the data discarding request and sending a layer 2 data discard acknowledgment protocol data unit (PDU), the layer 2 data discard acknowledgment PDU comprising a first field that ensures the first station to determine the number of layer 2 SDUs discarded by the second station;

wherein the first field indicates the number of layer 2 PDUs discarded by the second station when discarding the layer 2 SDUs.

7. A wireless communications system according to claim 6 wherein each layer 2 SDU to be discarded has a terminating layer 2 PDU that holds a terminating end of the layer 2 SDU, and the first field indicates the number of terminating layer 2 PDUs discarded by the second station.

8. A wireless communications system according to claim 6 wherein the first field comprises a bitmap that indicates a discard state for each layer 2 SDU to be discarded.

9. A wireless communications system according to claim 6 wherein the layer 2 data discard acknowledgement PDU further comprises a second field for indicating a starting sequence number for an updated receiving window of the second station, and a third field for indicating discarding of layer 2 SDU data within a layer 2 PDU having the starting sequence number.

10. A wireless communications system according to claim 6 wherein the first station comprises a layer 2 interface and a layer 3 interface, and the first field in the layer 2 data discard acknowledgment PDU enables the layer 2 interface to inform the layer 3 interface of the number of layer 2 SDUs discarded by the second station.

11. A method for acknowledging a wireless data discarding request transmitted by a first station to a second station for requesting the second station to discard at least a layer 2 service data unit (SDU), the method comprising:

generating a layer 2 data discard acknowledgment protocol data unit (PDU), the layer 2 data discard acknowledgment PDU comprising a first field that ensures the first station to determine the number of layer 2 SDUs discarded by the second station; and transmitting the layer 2 data discard acknowledgment PDU to the first station;

wherein each layer 2 SDU to be discarded has a terminating layer 2 PDU that holds a terminating end of the layer 2 SDU, and the first field indicates the number of terminating layer 2 PDUs discarded by the second station.

12. A method according to claim 11 wherein the first field comprises a bitmap that indicates a discard state for each layer 2 SDU to be discarded.

13. A wireless communications system comprising:

a first station capable of transmitting a data discarding request, the data discarding request being used to request discarding of at least a layer 2 service data unit (SDU); and a second station capable of receiving the data discarding request and sending a layer 2 data discard acknowledgement protocol data unit (PDU), the layer 2 data discard acknowledgment PDU comprising a first field that ensures the first station to determine the number of layer 2 SDUs discarded by the second station;

wherein each layer 2 SDU to be discarded has a terminating layer 2 PDU that holds a terminating end of the layer 2 SDU, and the first field indicates the number of termination layer 2 PDUs discarded by the second station.

14. A wireless communications system according to claim 13 wherein the first field comprises a bitmap that indicates a discard state for each layer 2 SDU to be discarded.

* * * * *